United States Patent [19]

Lindler et al.

[11] Patent Number: 4,722,180
[45] Date of Patent: Feb. 2, 1988

[54] METHOD AND MEANS FOR ENHANCING RECOVERY OF A SURGE CONDITION IN A GAS TURBINE ENGINE

[75] Inventors: Anita S. Lindler, Jupiter; James B. Kelly, Lake Worth, both of Fla.

[73] Assignee: United Technologies Corporation, Hartford, Conn.

[21] Appl. No.: 932,960

[22] Filed: Nov. 20, 1986

[51] Int. Cl.⁴ .............................................. F02C 9/50
[52] U.S. Cl. .................................. 60/39.03; 60/39.27; 60/261
[58] Field of Search ............... 60/39.03, 39.27, 39.281, 60/39.282, 39.29, 261

[56] References Cited

U.S. PATENT DOCUMENTS

| | | | |
|---|---|---|---|
| 2,805,543 | 9/1957 | Lawry et al. | 60/39.281 |
| 3,868,625 | 2/1975 | Speigner et al. | 60/39.281 |
| 3,876,326 | 4/1975 | Weitz | 60/39.29 |
| 3,977,184 | 8/1976 | Smith | 60/39.281 |
| 4,117,668 | 10/1978 | Elsaesser | 60/39.03 |
| 4,118,926 | 10/1978 | Curvino | 60/39.281 |
| 4,594,050 | 6/1986 | Gaston | 415/1 |
| 4,594,051 | 6/1986 | Gaston | 415/48 |

Primary Examiner—Louis J. Casaregola
Attorney, Agent, or Firm—Troxell K. Snyder

[57] ABSTRACT

A system (38) and method for directing control actions to recover from the occurrence of a surge condition within a turbocompressor includes a high/low engine power output discriminator (40). Control action is taken by the system (38) in response to both the detection of a surge condition and the current engine power output level. The system (38) selects among a plurality of corrective control actions (56, 62, 68) to best achieve a return to normal engine operation.

7 Claims, 2 Drawing Figures

METHOD AND MEANS FOR ENHANCING RECOVERY OF A SURGE CONDITION IN A GAS TURBINE ENGINE

The Government of the United States has rights to this invention under Air Force Contract F33657-84-C-2014.

FIELD OF THE INVENTION

The present invention relates to a method and means for controlling surge in a gas turbine engine.

BACKGROUND OF THE INVENTION

Surge is a condition occurring within turbomachine compressors wherein the rotating compressor or fan blades experience an aerodynamic stall over at least a portion of the blade surface. Surge may be induced by unstable (turbulent) airflow entering the turbomachine compressor, excessive back pressure, rapid change in angular velocity, etc. Flow instability resulting from a surge condition in a rotor stage in an axial flow turbocompressor may cause surging in adjacent stages, depending upon the severity of the condition.

The occurrence of such compressor surges in a gas turbine engine is familiar to both designers and operators of such engines. Devices for detecting the onset of a surge condition are well known in the art as seen, for example, in U.S. Pat. Nos. 3,868,625 issued to Speigner et al, 4,117,668 issued to Elsaesser et al and 4,594,050 issued to Gaston. Such detectors, monitoring the direction and speed of engine airflow, the rate of change of engine rotor speed, and temperature change in the air inlet, respectively, provide accurate, rapid indication of the onset and continuation of a surge condition.

While the occurrence of a surge condition in an operating gas turbine engine is always of concern to the operator, this concern is most acute in an aircraft propulsion application wherein the occurrence of a surge condition often leads to a reduction in engine thrust and hence a degradation in overall aircraft performance. Of still greater concern is the occurrence of a surge in a single engine aircraft wherein the negative consequences of a loss of thrust are more severe than in a multi-engine aircraft. It should also be noted that single engine aircraft are typically designed to operate at maximum performance levels for a given engine configuration and are often equipped with afterburning thrust augmentors. Such configurations are more prone to the occurrence of a surge condition than "commerical rated" engines wherein larger operational safety margins are provided to reduce the likelihood of the occurrence of a surge condition.

Restoration of a surging engine to normal operation has, in the prior art, typically required completely shutting down the operating engine and restarting after the surge condition has cleared. Such response, while effective, is undesirable for many aircraft applications due to the loss of thrust described above. One recovery system of the prior art is shown in U.S. Pat. No. 4,118,926 issued to Curvino et al wherein a stall detector including a means for restarting the engine following shutdown is presented. The value of the Curvino recovery system is in the automatic restarting of the engine immediately upon verification of the clearance of the surge condition.

Another method for detecting and controlling surge in a motor-driven turbocompressor is disclosed in U.S. Pat. No. 4,594,051 issued to Gaston. The Gaston system includes a temperature sensing surge detection system and an anti-surge control bypass valve for venting the turbocompressor to atmosphere following detection of a surge condition within the compressor. The Gaston system is directed toward a process compressor driven by an independent prime mover and is therefore not directly applicable to an aircraft propulsion application.

What is required is a method and a means for returning a surging gas turbine engine to a normal operating condition without requiring a full shutdown and restart.

SUMMARY OF THE INVENTION

It is therefore an object of the present invention to provide a method and a means for increasing the recoverability of a surging gas turbine engine.

It is further an object of the present invention to monitor the current engine power output upon detection of a surge condition and to select among a plurality of potential engine control actions in response thereto.

According to the present invention, the current level of power output of a gas turbine engine is determined upon the detection of a surge condition. Responsive to the power output level, controllable engine parameters are varied to increase the likelihood of recovery of the engine from the surge condition while avoiding an undesirable shutdown and restart.

Determination of the current engine power output level includes monitoring the position of variable position compressor vanes in the engine; monitoring the flow of fuel to a thrust augmentor, if present; and/or monitoring other engine parameters indicative of current engine operational status. Responsive to the current engine power level, the method and means according to the present invention selects among a plurality of corrective control actions to restore the engine to a normal operating condition without undergoing a full engine shutdown and restart.

Such control actions may include, for example, reducing the flow of fuel to the engine in response to a surge detected at a low engine power level, shutting off the flow of fuel to the augmentor in response to a continuing surge condition detected during augmentor operation, or other beneficial control actions corresponding to the current engine operational status.

Both these and other objects and advantages of the present invention will be apparent to those skilled in the art upon review of the following specification and the appended claims and drawing figures.

DETAILED DESCRIPTION OF THE INVENTION

Figure 1:
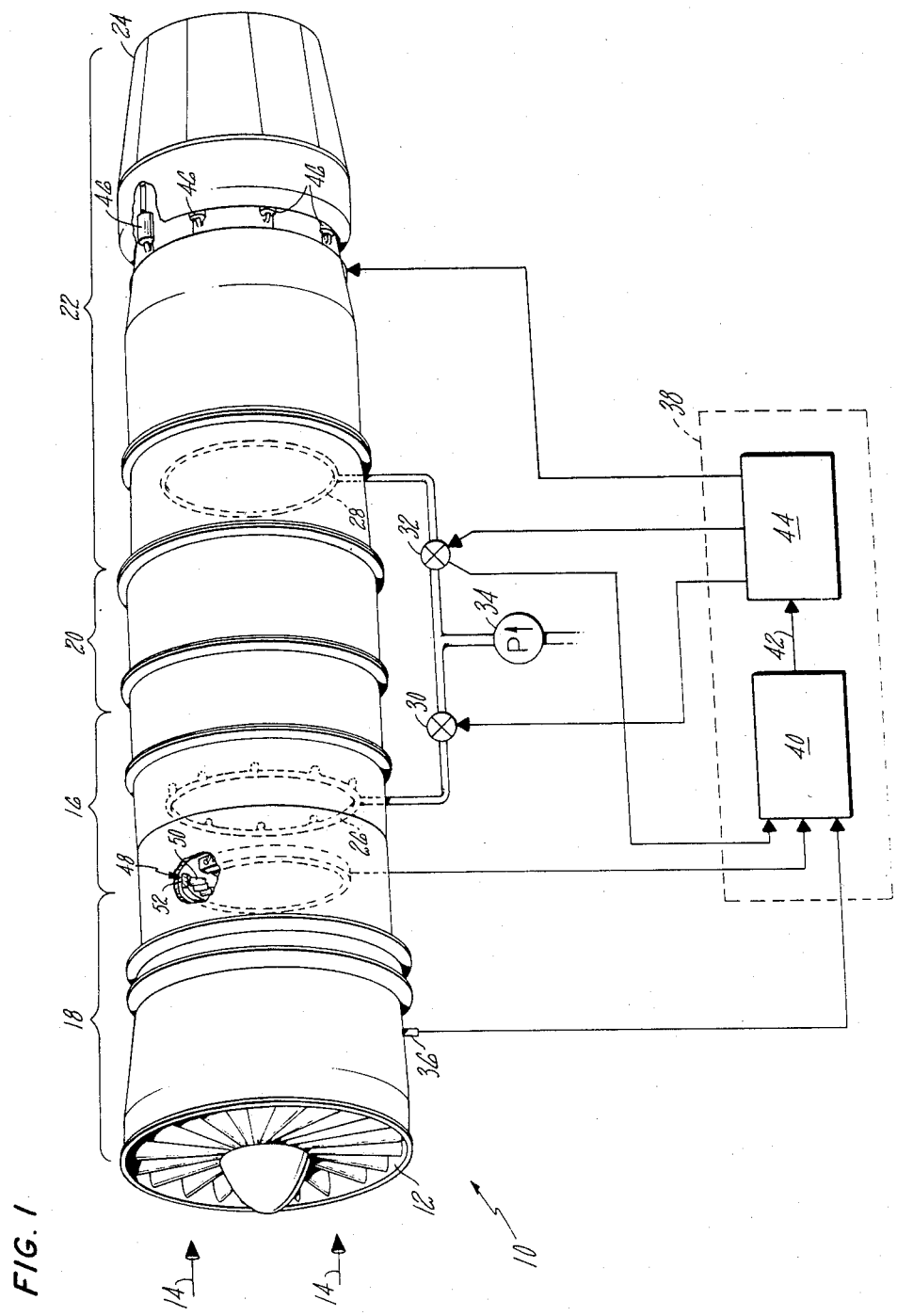
FIG. 1 shows a schematic representation of an augmented gas turbine engine and the surge condition recovery means according to the present invention.

Referring now to the drawing Figures, and in particular to FIG. 1 thereof which shows a schematic view of a gas turbine engine 10 having an inlet 12 for receiving a flow of air 14 into an axially forward compressor section 18, an axially central combustor section 16, and an axially rearward turbine section 20. The FIG. 1 gas turbine engine arrangement also includes a thrust augmentor 22 secured to the outlet of the engine turbine section 20, and including a variable area exhaust nozzle 24.

Both the combustor section 16 and the augmentor section 22 receive controllable flows of fuel through respective manifolds 26, 28. The flow of fuel to each manifold 26, 28 is controlled by respective valves 30, 32. The fuel flow to the engine is supplied by a main fuel pump 34 or the like.

The control system 38 for detecting and directing the recovery from a surge condition present within the compressor section 18 of the engine 10 is also illustrated schematically in FIG. 1. The system comprises a surge detector 36 utilizing temperature, pressure, angular velocity change of the engine rotor, or any other indicative parameter known in the art for providing an accurate and timely indication of the occurrence of a surge condition within the engine 10.

It has been found that surge within the compressor section 18 of a gas turbine engine 10 may occur under a variety of engine power levels and operating conditions, and further that the best method for recovering from such a surge condition varies dependent upon the current engine operating conditions. For example, the occurrence of surge at a relatively low power (less than 50% engine power output or thrust) level is best addressed by reducing the flow of fuel to the engine combustor section 16. Alternatively, the best control action to correct compressor surging occurring during operation of the thrust augmentor 22 is to shut off the flow of augmentor fuel thereby reducing turbine exhaust pressure and allowing the engine to resume proper operation.

It should be apparent to those skilled in the art that each of the preceding control actions, while ideally suited to the corresponding engine operating condition, would be wholly inappropriate if applied to other than the corresponding engine power level or operating condition. For example, reducing the flow of fuel to the engine combustor section 16 is likely to aggravate a surge condition occurring during operation of the engine at a relatively high power level (greater than 50% power output or thrust). Similarly, a control attempt to shut off augmentor fuel flow in response to a surge condition during unaugmented operation would not be effective as the augmentor fuel flow is already at zero.

The system 38 according to the present invention thus provides a means 40 responsive to the occurrence of a surge condition within the compressor section 18 and to the current engine power output level for determining if the engine is operating at relatively high (greater than 50% rated thrust or power output) or low (less than or equal to 50% of rated thrust or power output) level. The results 42 of this determination are used by a control action means 44 shown schematically in FIG. 1 which in turn operates the appropriate engine control devices, such as the combustor fuel control valve 30, the augmentor fuel control valve 32, or augmentor nozzle area control actuators 46, as appropriate to effect the recovery of the engine 10 from the surge condition.

Central to the system for recovering from the surge condition according to the present invention is the determination of the current engine power level. Since the power level determined must be accurate, the engine power level or throttle (not shown) cannot be used as such power level is merely an indication of the power output desired by the engine operator rather than the actual engine condition. One engine physical parameter which has proved to be an exceptionally accurate gauge of the relative engine power output level is the position of the variable angle compressor vanes 48. Individual vanes 50 are rotated in unison by a ring 52 typically encircling the compressor section 18. The position of the variable vane system 48 is scheduled by the engine controller (not shown) based upon a plurality of current engine operating parameters, such as rotor speed, engine pressure ratio, burner pressure, etc. The vane position is an accurate indication of the engine mass throughput and hence power output.

In one particular engine design, the angle of the variable vanes in the rear compressor varies between $-35°$ at ground idle (minimum power) to $+4°$ at maximum thrust (maximum power), measured relative to the engine axis. The line of demarcation between high and low power engine output levels occurs at $-20°$, resulting in a clear, single physical parameter which may be used by the high/low power level determining means 40 for establishing a power level signal 42 for the control action means 44.

Another important parameter is the operational status of the afterburner section 22. Such status is best indicated by the flow of fuel to the augmentor fuel manifold 28 which is in turn best indicated by the position of the augmentor fuel control valve 32. Hence, the engine power level determining means 40 also monitors this single parameter and used the information as discussed hereinabove.

Figure 2:
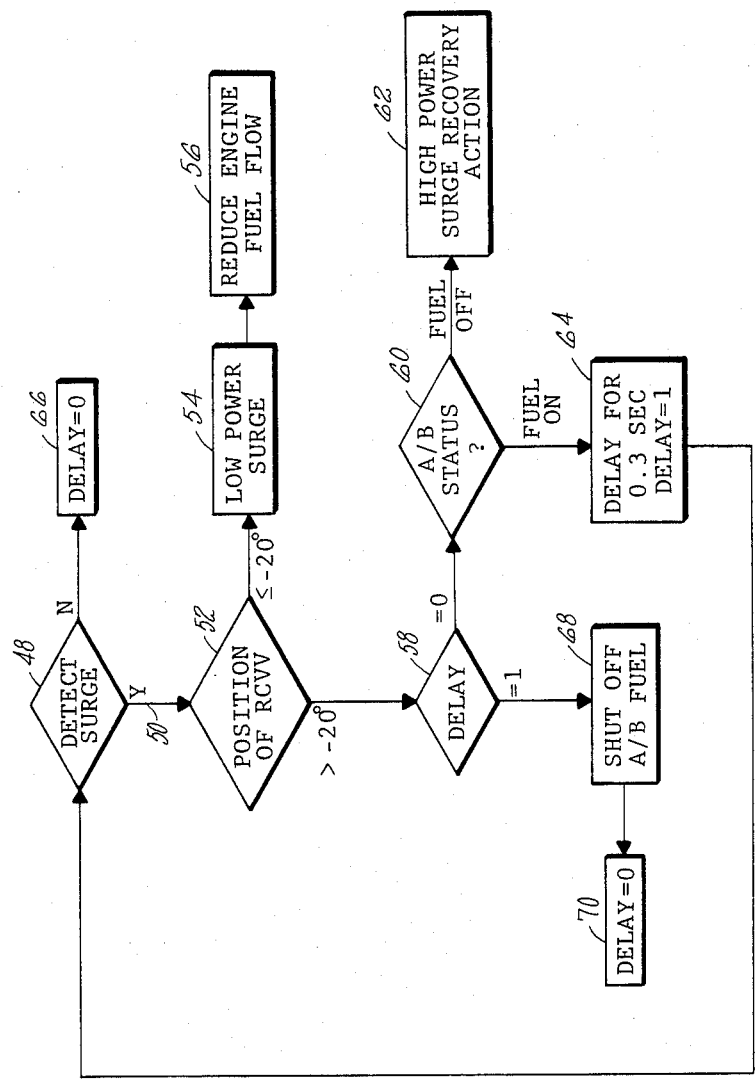
FIG. 2 shows one logic diagram for discriminating among a plurality of engine power levels and for selecting the appropriate control action in response to a surge condition.

Referring now to FIG. 2, one possible logical sequence for recovering from a surge condition in a gas turbine engine 10 will be discussed in detail. It should be noted that the illustrated logical sequence, while possible optimum for one engine configuration or design, may be modified and adapted within the scope of the invention without departing therefrom. The logic diagram presented is suitable for an augmented gas turbine engine but may likewise be readily adapted to a non-augmented engine configuration by eliminating those steps which correspond thereto.

The logical sequence disclosed in FIG. 2 begins with the surge detection decision block 48. The system according to the present invention takes no action until such time as a positive surge indication is received. A positive surge indication 50 advances the system and method according to the present invention to the high/low power level decision block 52 wherein the position of the rear compressor variable vanes 48 is determined. For variable vane angles of less than or equal to $-20°$ in a particular engine, the engine power level is determined to be a low power surge condition 54 and the control action means 44 operates to immediately reduce engine fuel flow 56 which has been found to be the most effective action to facilitate the return of the engine to normal operation.

For variable vane position angles greater than $-20°$, the engine is determined to be operating at a high power level and the system and method according to the present invention next checks 58 the status of a delay flag which is explained more fully hereinbelow. For a delay flag equal to 0, indicative of a first pass through the control logic loop, the system and method next determine the afterburner operating status 60. If no fuel is flowing to the afterburner, indicating a non-operational status, the proper control action 62 is taken to recover from a high power level, non-augmented surge condition.

No action is indicated in the FIG. 2 logic diagram as such high power level surges are most often induced by aircraft external flow condition which are not influenced by engine control actions. One example is a high speed turn or abrupt climbout wherein the air entering the inlet opening of the engine nacelle (not shown) detaches from the opening lip and enters the engine inlet 12 as a turbulent, recirculating stream thus inducing stall within the compressor section 18. Under such conditions, the best corrective control action is to maintain engine fuel flow and non-augmented thrust level, possibly correcting the aircraft angle of attack in order to smooth the entering air flow. Although disclosed as a "non-action" control action, the method and system according to the present invention provides the discriminated output 62 necessary to initiate any reasonable control action which may be developed or now in use for recovering from such high power level, non-augmented stall conditions, including such actions as changing the augmentor variable area nozzle 24, repositioning the variable compressor vanes 48, etc.

For an augmentor operational status wherein a flow of fuel is established by the position of the augmentor fuel control valve 32, the method and system according to the present invention imposes a delay 64 for a preselected period of time in order to allow the engine 10 and augmentor 22 to recover from a temporary surge condition such as may be initiated during the initial lightoff of the augmentor 22. Such a delay, typically in the range of 0.2–0.3 seconds, depending upon the particular engine-configuration, is sufficient to allow a transitory surge condition to pass of its own accord. To establish the status of such a condition, the system according to the present invention sets the delay flag equal to one and returns to the surge detection decision block 48. If the surge has passed, the delay flag is reset to 066 and no action is taken. If the surge continues to be present within the engine, the system and method according to the present invention again establish that the engine 10 is operating at a high power level 52, however the delay flag decision block 58, receiving a delay flag equal to one and indicative of the occurrence of a continuing surge condition, establishes the existence of a high power level, afterburning surge condition. The appropriate response to an augmented, high power level surge is the immediate shutoff 68 of fuel flow to the afterburner, reducing engine turbine section outlet pressure and allowing the restoration of normal flow conditions within the compressor section 18. The delay flag is set 70 to zero and the system is ready to continue monitoring engine operation.

The value of such a system has been established in numerous engine tests, having achieved surge recovery rates from 50 to 100% of total surge as opposed to a base line (uncontrolled) surge recovery rate of 0.

The system and method according to the present invention is thus a valuable addition to control circuit logic and provides a greater measure of engine reliability and operability over the prior art stall recovery methods and devices.

We claim:

1. A method for recovering from an occurrence of a surge condition in a gas turbine engine operating within a power output range and including a plurality of variable position compressor vanes, comprising the steps of
   (a) detecting the occurrence of the surge condition;
   (b) determining a current power output level within the power output range, including the steps of
       monitoring the current position of the compressor vanes, and
       determining the current engine power output level from the current position of the compressor vanes;
   (c) correctively controlling the gas turbine engine, responsive to both the detected surge condition and the current engine power output level, for restoring the gas turbine engine to a normal operating condition.

2. A method for recovering from an occurrence of a surge condition within a gas turbine engine operating within a power output range and including a thrust augmentor having a controllable flow of augmentor flow and a variable area exhaust nozzle, comprising the steps of:
   (a) detecting the occurrence of the surge condition;
   (b) determining a current engine power output level within the power output range, including the step of monitoring the augmentor fuel flow; and
   (c) correctively controlling the gas turbine engine, responsive to both the detected surge condition and the current engine power output level, for restoring the gas turbine engine to a normal operating condition.

3. The method for recovering from a surge condition as recited in claim 1, wherein
   the engine power output level is determined to be either a low power level or a high power level.

4. The method for recovering from a surge condition as recited in claim 3, wherein
   the gas turbine engine receives a controllable flow of fuel, and
   wherein step (c) further includes the step of
   reducing the rate of flow of engine fuel responsive to both the detected surge condition and the determined engine power level being a low power level.

5. The method for recovering from a surge condition as recited in claim 1, wherein step (c) further comprises the steps of
   delaying correctively controlling the gas turbine engine for a preset period of time in response to the detected surge condition and a monitored augmentor fuel flow other than zero;
   subsequent to the expiration of the preset period of time, determining if the surge condition is still occurring within the gas turbine engine, and
   shutting off the flow of augmentor fuel following a determination of a continued surge condition occurrence.

6. The method for recovery from a surge condition as recited in claim 4, wherein
   the gas turbine engine includes a thrust augmentor having a controllable flow of augmentor fuel and a variable area exhaust nozzle, and
   wherein step (b) further includes
   monitoring the augmentor fuel flow.

7. The method for recovering from a surge condition as recited in claim 6, wherein step (c) further comprises the steps of
   delaying correctively controlling the gas turbine engine for a preset period of time in response to the detected surge condition and a monitored augmentor fuel flow other than 0;
   subsequent to the expiration of the preset period of time, determining if the surge condition is still occurring within the gas turbine engine, and
   shutting off the flow of augmentor fuel following a determination of a continued surge condition occurrence.

* * * * *